United States Patent
Yasuda et al.

(10) Patent No.: US 9,417,416 B2
(45) Date of Patent: Aug. 16, 2016

(54) OPTOELECTRICAL COMPOSITE CABLE

(71) Applicant: Hitachi Metals, Ltd., Tokyo (JP)

(72) Inventors: Hiroki Yasuda, Mito (JP); Kouki Hirano, Hitachinaka (JP); Hiroshi Sakaguchi, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 138 days.

(21) Appl. No.: 14/209,890

(22) Filed: Mar. 13, 2014

(65) Prior Publication Data
US 2014/0321822 A1    Oct. 30, 2014

(30) Foreign Application Priority Data

Apr. 25, 2013    (JP) ................................. 2013-092405

(51) Int. Cl.
G02B 6/44    (2006.01)

(52) U.S. Cl.
CPC ............ *G02B 6/4416* (2013.01); *G02B 6/4413* (2013.01)

(58) Field of Classification Search
None
See application file for complete search history.

(56) References Cited

U.S. PATENT DOCUMENTS

| 8,909,012 B2* | 12/2014 | Register, III | H01B 11/22 |
| | | | 385/10 |
| 2012/0281953 A1* | 11/2012 | Choi | G02B 6/4416 |
| | | | 385/101 |

FOREIGN PATENT DOCUMENTS

| JP | 2012-009156 A | 1/2012 |
| JP | 2012-059495 A | 3/2012 |

OTHER PUBLICATIONS

Machine translation of JP2012-009156A.*
Machine translation of JP2012-009156A published on Jan. 12, 2012.*

* cited by examiner

*Primary Examiner* — Sung Pak
(74) *Attorney, Agent, or Firm* — McGinn IP Law Group PLLC

(57) ABSTRACT

An optoelectrical composite cable includes an optical fiber; a resin inner cylinder that accommodates the optical fiber; a plurality of electrical lines arranged outside the inner cylinder so as to cover a surrounding of the inner cylinder, and a tubular outer cylinder that collectively covers the plurality of electrical lines. The plurality of electrical lines include pairs of electrical lines, and the electrical lines constitute at least one of the pairs of electrical lines have a larger outer diameter than the other electrical lines and are arranged at opposing positions, with the inner cylinder being interposed therebetween.

20 Claims, 3 Drawing Sheets

OPTOELECTRICAL COMPOSITE CABLE

The present application is based on Japanese patent application No. 2013-092405 filed on Apr. 25, 2013, the entire contents of which are incorporated herein by reference.

BACKGROUND OF THE INVENTION

1. Field of the Invention the present invention relates to an optoelectrical composite cable having an optical fiber and a plurality of electrical lines.

2. Description of the Related Art

Optoelectrical composite cables in which an optical fiber and electrical lines are covered with a single sheath have been known as cables used for signal transmission and so on between electronic apparatuses, such as computers.

Japanese Unexamined Patent Application Publication No. 2012-9156 discloses an optoelectrical composite cable in which optical fibers are arranged in a tube and a plurality of electrical lines are arranged around the circumference of the tube. A power-supply line for power supply and a signal line for signal transmission are use as the electrical lines arranged around the circumference of the tube.

Related technologies include Japanese Unexamined Patent Application Publication No. 2012-9156 and Japanese Unexamined Patent Application Publication No. 2012-59495.

SUMMARY OF THE INVENTION

When an optoelectrical composite cable is used as a cable for long distance transmission or when it is required to flow a large electrical current in power-supply lines through which large power is to be supplied, it is generally necessary to increase the conductor cross-sectional areas of the power-supply lines in order to reduce transmission loss in the power-supply lines. In such cases, the outer diameters of the power-supply lines become larger than the outer diameters of signal lines whose conductor cross-sectional areas do not have to be increased since small electrical currents are transmitted therethrough, and thus the outer diameters of the signal lines and the outer diameters of the power-supply lines differ from each other. Such a difference in the diameters of the electrical lines may cause imbalance in the entire cross-sectional shape of the optoelectrical composite cable.

In an optoelectrical composite cable using a tube as described above, when the cross-sectional shape becomes unbalanced, a load is more likely to be applied to the tube upon application of an external force. Thus, when an external force, such as bending, is applied, the tube is deformed to cause a lateral pressure to act on optical fibers, and microbending (i.e., slight bending of the central axis of the core as a result of application of the lateral pressure) may cause an increase in optical loss and may cause breakage of the optical fibers. Hence, a problem arises in that reliability cannot be sufficiently ensured. In addition, when the cross-sectional shape of the optoelectrical composite cable becomes unbalanced, a problem also arises in that it is difficult to wire the optoelectrical composite cable in a desired layout.

The present invention has been made in view of the foregoing situation, and an object of the present invention is to provide an optoelectrical composite cable that is high in reliability and that is easy to wire.

In order to achieve the foregoing object, the present invention provides an optoelectrical composite cable. The optoelectrical composite cable includes an optical fiber; a resin inner cylinder that accommodates the optical fiber; a plurality of electrical lines arranged outside the inner cylinder so as to cover a surrounding of the inner cylinder, and a tubular outer cylinder that collectively covers the plurality of electrical lines. The plurality of electrical lines include pairs of electrical lines, and the electrical lines constitute at least one of the pairs of electrical lines have a larger outer diameter than the other electrical lines and are arranged at opposing positions, with the inner cylinder being interposed therebetween.

The plurality of electrical lines may include signal lines that constitute the pair of electrical lines for signal transmission and power-supply lines that constitute the pair of electrical lines for power supply, and the power-supply lines may have a larger outer diameter than the signal lines and may be arranged at opposing positions, with the inner cylinder being interposed therebetween.

The power-supply lines may include a power feeder line and a ground line, and the power feeder line and the ground line may be arranged at opposing positions, with the inner cylinder being interposed therebetween.

The power feeder line may be constituted by a plurality of power feeder lines, and the ground line may be constituted by a plurality of ground lines.

The plurality of power-supply lines may be arranged adjacent to each other, and the plurality of ground lines may be arranged adjacent to each other.

The plurality of electrical lines may be helically wound around an outer circumferential surface of the inner cylinder and may be interposed between the inner cylinder and the outer cylinder. When the inner cylinder receives a load upon receiving an external force from a circumference side of the outer cylinder, the adjacent electrical lines may contact each other and the electrical lines may slide relative to the inner cylinder to thereby reduce the load.

According to the present invention, it is possible to provide an optoelectrical composite cable that is high in reliability and that is easy to wire.

BRIEF DESCRIPTION OF THE DRAWINGS

The foregoing and other exemplary purposes, aspects and advantages will be better understood from the following detailed description of the invention with reference to the drawings, in which.

DESCRIPTION OF THE PREFERRED EMBODIMENT

Figure 1:
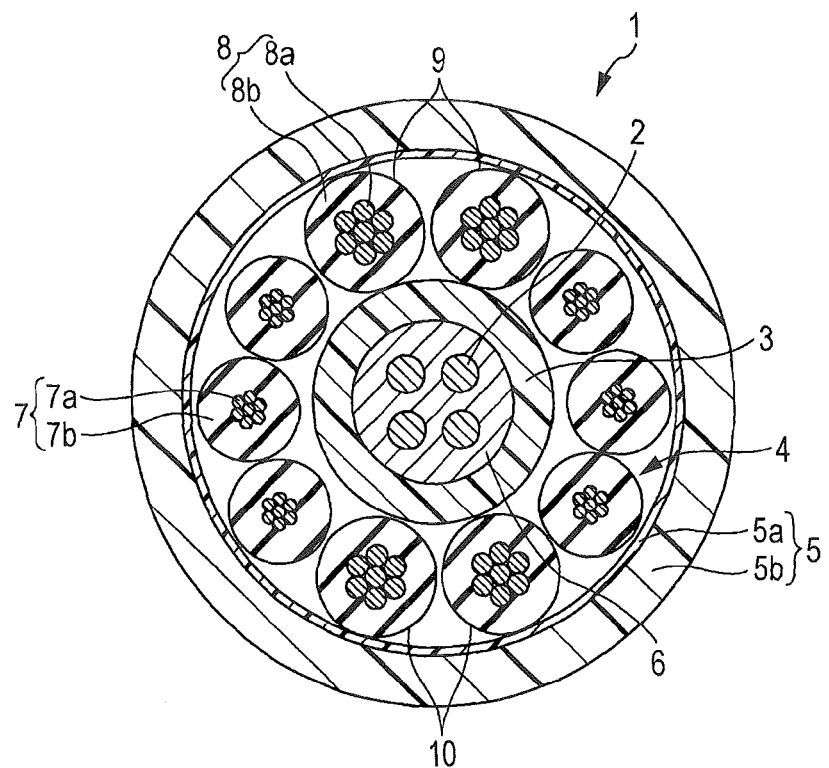
FIG. 1 is a transverse sectional view of an optoelectrical composite cable according to one embodiment of the present invention.

Referring now to the drawings, and more particularly to FIGS. 1-6, there are shown exemplary embodiments of the methods and structures according to the present invention.

An embodiment of the present invention will be described below with reference to the accompanying drawings.

Figure 2:
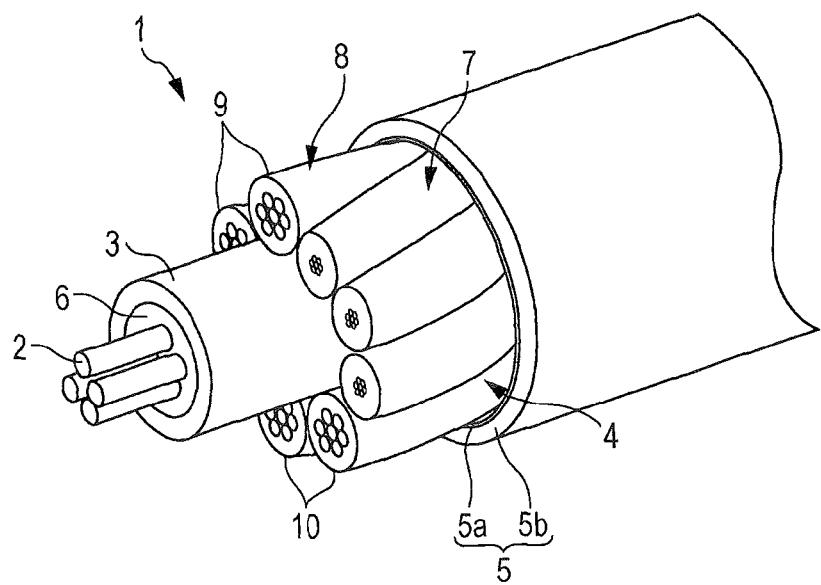
FIG. 2 is a perspective view illustrating the structure of the optoelectrical composite cable in FIG. 1.

FIG. 1 is a transverse sectional view of an optoelectrical composite cable according to the present embodiment, and FIG. 2 is a perspective view illustrating the structure thereof.

As illustrated in FIGS. 1 and 2, an optoelectrical composite cable 1 includes optical fibers 2, a tube 3 serving as a resin inner cylinder that accommodates the optical fibers 2, electrical lines 4 arranged outside the tube 3 so as to cover the surrounding of the tube 3, and a tubular outer cylinder 5 that collectively covers of the electrical lines 4.

Although a case in which four optical fibers 2 are provided is described herein, the number of optical fibers 2 is not limited thereto and may be any number larger than or equal to one. The optical fibers 2 may be single-mode optical fibers or may be multi-mode optical fibers.

A fiber bundle 6 made of aramid, Kevlar (registered trademark), or the like is accommodated around the optical fibers 2 and in the tube 3. The fiber bundle 6 serves as a reinforcing member for enhancing the tensile strength of the optoelectrical composite cable 1, and it is desirable that the fiber bundle 6 be accommodated such that the ratio of space in the tube 3 is 35% or more. The fiber bundle 6 is not necessarily required, and can be omitted, for example, when a sufficient tensile strength can be ensured with the tube 3 or the outer cylinder 5.

The tube 3 may be made of fluorinated ethylene propylene (FEP), perfluoro alkoxy (PFA), polyvinylidene difluoride (PVDF), polyether ether ketone (PEEK), or ethylene vinyl acetate (EVA). It is desirable that the elastic modulus of the tube 3 be 0.3 GPa or greater or 4.0 GPa or smaller. This is because, when the elastic modulus of the tube 3 is smaller than 0.3 GPa, the optical fibers 2 cannot be sufficiently protected, and when the elastic modulus exceeds 4.0 GPa, the flexibility decreases.

The electrical lines 4 are provided in an annular space between the tube 3 and the outer cylinder 5. In the present embodiment, ten electrical lines 4, each having a circular cross-section shape, are arranged around the circumference of the tube 3. The electrical lines 4 are arranged such that they do not overlap in the diameter direction. Although details are described below, it is desirable that the electrical lines 4 be arranged in close proximity to each other so that, when an external force is applied thereto, the external force is not directly transmitted to the tube 3.

The outer cylinder 5 is constituted by a resin tape 5a for binding the electrical lines 4 together and a tubular resin sheath 5b formed around the circumference of the tape 5a. The tape 5a is spirally wound in contact with the outer surfaces of the electrical lines 4. The tape 5a may be realized by, for example, a paper tape or a tape made of polytetrafluoroethylene (PTFE). The sheath 5b may be realized by, for example, a sheath made of polyethylene (PE) or polyvinyl chloride (PVC). The tape 5a and the sheath 5b may have therebetween a braid having a large number of interplaited conductors and a shield layer including a conductive tape having a conductive metal film formed on a resin tape.

In the optoelectrical composite cable 1 according to the present embodiment, the electrical lines 4 include a plurality of pairs of electrical lines for signal transmission or power supply, and the electrical lines 4 that constitute at least one of the pairs of electrical lines have a larger outer diameter than the other electrical lines 4 and are arranged at opposing positions, with the tube 3 being interposed therebetween.

That is, in the optoelectrical composite cable 1, the pair of electrical lines 4 having a large diameter is arranged at opposing positions, with the tube 3 being interposed therebetween. With such an arrangement, the electrical lines 4 having a large diameter are separately arranged, thus making it possible to suppress imbalance in the cross-sectional shape.

The electrical lines 4 are constituted by the signal lines 7 that constitute pairs of electrical lines for signal transmission and power-supply lines 8 that constitute pairs of electrical lines for power supply. The power-supply lines 8 are constituted by power feeder lines 9 and ground lines 10. Each of the signal lines 7 has a configuration in which center conductors 7a, which are stranded conductors, are covered with an insulator 7b. Each of the power-supply lines 8, that is, the power feeder lines 9 and the ground lines 10, has a configuration in which center conductors 8a, which are stranded conductors, are covered with an insulator 8b. One or more of the electrical lines 4 may be dummy lines that do not permit electrical transmission, and one or more electrical lines 4 that are not paired may also be included.

In the present embodiment, the power-supply lines 8 are formed to have a larger outer diameter than the signal lines 7, and the power-supply lines 8 having a larger outer diameter are arranged at opposing positions, with the tube 3 being interposed therebetween.

In the present embodiment, the power feeder lines 9 and the ground lines 10 are arranged at opposing positions, with the tube 3 being interposed therebetween. Such an arrangement makes it easy to route lines in cable terminals, compared with a case in which the power feeder lines 9 and the ground lines 10 are arranged adjacent to each other, thus making it possible to facilitate installation on a substrate and so on.

For long-distance transmission applications or for applications using a large electrical current, it is typically necessary to increase the cross-sectional area of the center conductors 8a in the power-supply line 8 in order to reduce transmission loss in the power-supply line 8. In such a case, the outer diameter of the power-supply line 8 becomes too large, and the imbalance in the cross-sectional shape may increase.

Accordingly, in the present embodiment, the plurality of power feeder lines 9 are provided, the plurality of ground lines 10 are provided, and these power feeder lines 9 and ground lines 10 are used as a single power-supply line, so as to ensure a large cross-sectional conductor area and to suppress transmission loss in the power-supply line. The provision of the plurality of power feeder lines 9 and the plurality of ground lines 10 allows the diameters of the power feeder lines 9 and the ground lines 10 to be set close to the diameters of the signal lines 7 to thereby enable the cross-sectional shape of the optoelectrical composite cable 1 to be close to a circular shape, while reducing transmission loss in the power-supply line. This makes it possible to suppress imbalance in the cross-sectional shape and also makes it possible to reduce the diameter of the optoelectrical composite cable 1.

Although a case in which two power feeder lines 9 and two ground lines 10 are provided is described herein, the number of power feeder lines 9 and the number of ground lines 10 are not limited thereto. In order to facilitate wiring in terminals, it is desirable that the power feeder lines 9 be arranged adjacent to each other and the ground lines 10 be arranged adjacent to each other.

When the number of power feeder lines 9 and the number of ground lines 10 are increased, the outer diameters of the power feeder lines 9 and the ground lines 10 can be further reduced. For example, when a signal line having a shield (an external conductor) is used as the signal line 7, there may be cases in which the magnitude relationship between the outer diameters of the power-supply lines 8 and the signal lines 7 is reversed. In such a case, it is advisable that the pair of signal lines 7 having a larger outer diameter be arranged at opposing positions, with the tube 3 being interposed therebetween.

It is also desirable to satisfy the following expression:

$$0.8 D_2 \leq D_1 < D_2 \quad (1)$$

where $D_1$ indicates the outer diameter of a narrowest electrical line 4 (the signal line 7 in this case), and $D_2$ indicates the outer diameter of a widest electrical line 4 (the power-supply line 8 in this case). When the outer diameters of the electrical lines 4 are set in such a manner, it is possible to suppress constant depressing of the tube 3 by the specific electrical line 4 having a larger outer diameter and it is possible to suppress a large gap being created between the electrical line 4 having a smaller outer diameter and the outer circumferential surface of the tube 3 or between the electrical line 4 having a smaller outer diameter and the inner circumferential surface of the outer cylinder 5.

Figure 3:
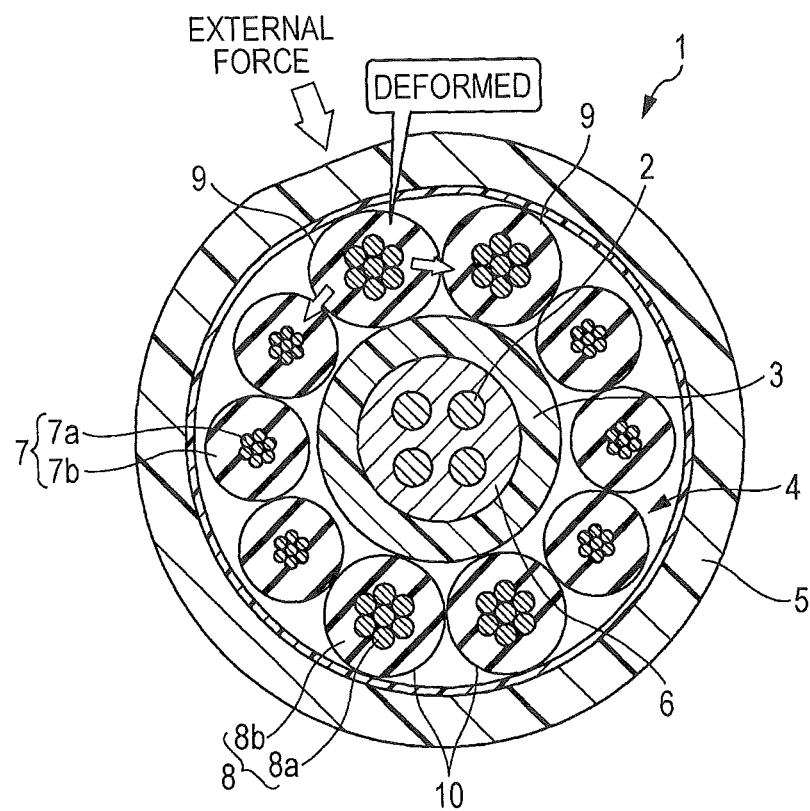
FIG. 3 is a transverse sectional view when an external force is applied to the optoelectrical composite cable in FIG. 1.

As illustrated in FIG. 3, when an external force is applied to the optoelectrical composite cable 1, the outer cylinder 5 is deformed at the position at which the external force is applied, and one or more of the electrical lines 4 receive an inward pressure. The electrical line(s) 4 that receive the pressure contact the tube 3, are thus elliptically deformed by a reaction force from the tube 3, and contact the adjacent electrical lines 4. When the electrical lines 4 are arranged in close contact with each other, there are also cases in which the electrical line(s) 4 that have received the pressure are directly pressed against the adjacent electrical lines. As a result of the mutual contact of the electrical lines 4, the pressure from the outer cylinder 5 is partly absorbed, so that the amount of load received by the tube 3 is reduced. As a result, it is possible to suppress the deformation of the tube 3 due to the external force.

In such a manner, according to the optoelectrical composite cable 1, the amount of load received by the tube 3, which is an inner cylinder, is reduced by the mutual contact of the adjacent electrical lines 4. Satisfying the relationship in (1) noted above and arranging the electrical lines 4 in close proximity to each other so that the adjacent electrical lines 4 contact each other makes it possible to ensure that the amount of load received by the tube 3 is received by the mutual contact of the electrical lines 4, and deformation of the tube 3 is suppressed.

In order to obtain the advantages, it is desirable that the number of electrical lines 4 be three or more and 20 or less. When the number of electrical lines 4 is one or two, the amount of load received by the tube 3 cannot be reduced by the mutual contact of the electrical lines 4, and when the number of electrical lines 4 exceeds 20, the surface pressure at the interface between the electrical lines 4 is reduced, and the advantage of the pressure absorption due to the mutual contact of the electrical lines 4 is reduced.

It is also desirable to satisfy:

$$(D_{out} - D_{in})/2 \times 0.8 \leq D_A < (D_{out} - D_{in})/2 \quad (2)$$

where $D_A$ indicates the average value of the outer diameters of the electrical lines 4, $D_{in}$ indicates the outer diameter of the tube 3, and $D_{out}$ indicates the inner diameter of the outer cylinder 5. That is, it is preferable that the outer diameter of the tube 3 be 80% or more of the distance between the tube 3 and the outer cylinder 5. Such an arrangement makes it possible to more reliably obtain the advantage that the amount of load received by the tube 3 is reduced by the mutual contact of the electrical lines 4. In this case, the outer diameter $D_{in}$ of the tube 3 and the inner diameter $D_{out}$ of the outer cylinder 5 are dimensions when the cross-sectional shapes of the tube 3 and the outer cylinder 5 have circular shapes without deformation.

In the optoelectrical composite cable 1, the electrical lines 4 are helically wound around the outer circumferential surface of the tube 3 and are interposed between the tube 3 and the outer cylinder 5. That is, the central axes of the electrical lines 4 are inclined relative to the direction parallel to the central axis of the optoelectrical composite cable 1 (i.e., in the longitudinal direction of the cable). It is desirable that the pitch of the helical winding of the electrical lines 4 be, for example, 5 mm or more and 150 mm or less (the distance along the longitudinal direction of the optoelectrical composite cable 1 when one electrical line 4 goes around the tube 3).

Since the plurality of electrical lines 4 are helically arranged, the flexibility of the optoelectrical composite cable 1 can be enhanced, and the optical fibers 2 receiving a lateral pressure can be suppressed when the optoelectrical composite cable 1 is bent, compared with a case in which the electrical lines 4 are arranged parallel to the tube 3.

That is, when the plurality of electrical lines 4 are arranged parallel to the tube 3, a tensile force is produced at the electrical lines 4 corresponding to the outer side of a bent portion, making bending difficult, and the tube 3 is pressed with the tensile force. A compression force that axially compresses the electrical lines 4 also acts on the electrical lines 4 corresponding to the inner side of the bent portion to thereby prevent bending of the optoelectrical composite cable 1. The compression force also causes deflection, i.e., outward expansion, of the electrical lines 4 to thereby depress the tube 3. In such a manner, the tube 3 is pressed from both of the inner and outer sides at the bent portion. Thus, when the bend radius is small, a lateral pressure acts on the optical fibers 2.

Figure 4:
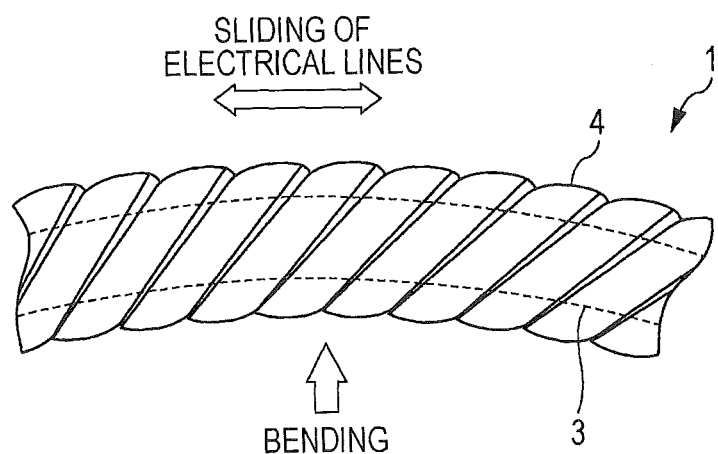
FIG. 4 is a schematic side view of the optoelectrical composite cable in FIG. 1, the outer cylinder in FIG. 1 not being illustrated in FIG. 4.

On the other hand, according to the present embodiment, as illustrated in FIG. 4, since the plurality of electrical lines 4 are helically arranged, no particular one of the electrical lines 4 is arranged at an entire portion at the outer or inner side of a bent portion (i.e., in a range larger than the pitch of the helical winding) of the optoelectrical composite cable 1. That is, according to the optoelectrical composite cable 1, the range in which each electrical line 4 exists at the outer or inner side of the tube 3 when the optoelectrical composite cable 1 is bent is limited to a range that is half or less of the pitch of the helical winding. Accordingly, the tensile force at a portion outside the tube 3 and the compression force at a portion inside the tube 3 cancel each other out. As a result, the force with which the electrical lines 4 press the tube 3 is reduced, and the flexibility of the optoelectrical composite cable 1 increases. In FIG. 4, the outer cylinder 5 is not illustrated.

When bending due to an external force is applied to the optoelectrical composite cable 1, the electrical lines 4 slide relative to the tube 3 in the longitudinal direction of the optoelectrical composite cable 1. The sliding of the electrical lines 4 relative to the tube 3 makes it possible to reduce the force that the tube 3 receives from the electrical lines 4 upon application of bending, makes it possible to suppress deformation of the tube 3, and also makes it possible to reduce a lateral pressure on the optical fibers 2. That is, in the optoelectrical composite cable 1, the load that the tube 3 receives when an external force is applied from the circumference side of the outer cylinder 5 is mitigated by the sliding of the electrical lines 4 relative to the tube 3.

It is desired that a material that facilitates sliding relative to the tube 3 be used for the insulators 7b and 8b. Examples of the material include fluorinated ethylene propylene (FEP), perfluoro alkoxy (PFA), polyvinylidene difluoride (PVDF), and polyethylene (PE). The use of such a material allows the electrical lines 4 to efficiently move when the optoelectrical composite cable 1 is bent and allows a lateral pressure acting on the optical fibers 2 to be reduced when bending is applied. In addition, when a sufficient amount of sliding between the tube 3 and the electrical lines 4 is ensured, it is also possible to prevent twisting and deformation of the tube 3 during manufacture. The insulators 7b and 8b may also be made of a material including polytetrafluoroethylene (PTFE), ethylene-polytetrafluoroethylene copolymer (ETFE), polypropylene (PP), polyethylene terephthalate (PET), or polyphenylene-sulfide (PPS).

It is also desirable that the thickness t of the tube 3 satisfy:

$$t \geq D_{in} \times 0.2 \qquad (3)$$

That is, it is preferable that the thickness t of the tube 3 be one-fifth or more of the outer diameter $D_{in}$. When the tube 3 is formed in such a manner, the strength of the tube 3 is ensured, deformation due to an external force is suppressed, and a lateral pressure acting on the optical fibers 2 can be reduced.

In addition, it is also desirable to satisfy:

$$d \times 4 < D \qquad (4)$$

where d indicates the outer diameter of the optical fibers 2, and D indicates the inner diameter of the tube 3. This is to ensure a gap between the optical fibers 4 and the tube 3 even if four optical fibers 2 are linearly arranged in the tube 3 and also to prevent a pressure from directly acting as a lateral pressure on the optical fibers 2, even if the tube 3 is deformed in a depressed manner.

It is also desirable that the ratio of space in which the optical fibers 2 and the fiber bundle 6 do not exist inside the tube 3 be 35% or more of the entire space inside the tube 3 (the ratio may be referred to as a "space factor"). More specifically, it is preferable that the ratio of the volume of the four optical fibers 2 in the internal space of the tube 3 (occupancy rate) be 2% or more or 25% or less. It is also preferable that the ratio (space factor) of the volume of the fiber bundle 6 in the space inside the tube 3 be 2% or more and 50% or less. In this case, the space factor is 96% or less (or 98% or less, when the fiber bundle 6 is not accommodated).

As a result of setting of the space factor in the manner described above, the optical fibers 2 receiving a lateral pressure due to the deformation is depressed even when the tube 3 is deformed by an external force. That is, when the tube 3 is deformed in a crushed manner by an external force, the deformation is absorbed by a reduction in the space in which the optical fibers 2 and the fiber bundle 6 do not exist. This suppresses the pressure on the tube 3 directly acting on the optical fibers 2 as a lateral pressure.

Figure 5:
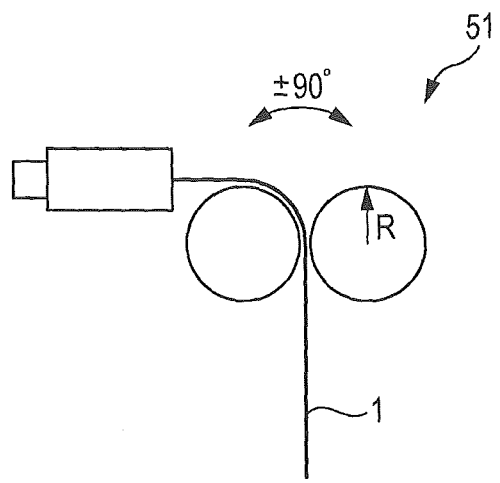
FIG. 5 is a schematic view illustrating a bending test in the present invention.

A trial product of the optoelectrical composite cable 1 in FIG. 1 is fabricated, and a bending test apparatus 51 as illustrated in FIG. 5 was used to perform bending test in which bending the optoelectrical composite cable 1 to the left and right by 90 degrees in each cycle with a bend radius R of 37 mm was repeated. The bending test was performed with a target of 100 cycles. Even when bending at 500 cycles, which greatly exceeded the target, was applied, an abnormality, such as breakage of the optical fibers 2, did not occur, thus confirming that high tolerance to bending and sufficiently high reliability were obtained.

Figure 6:
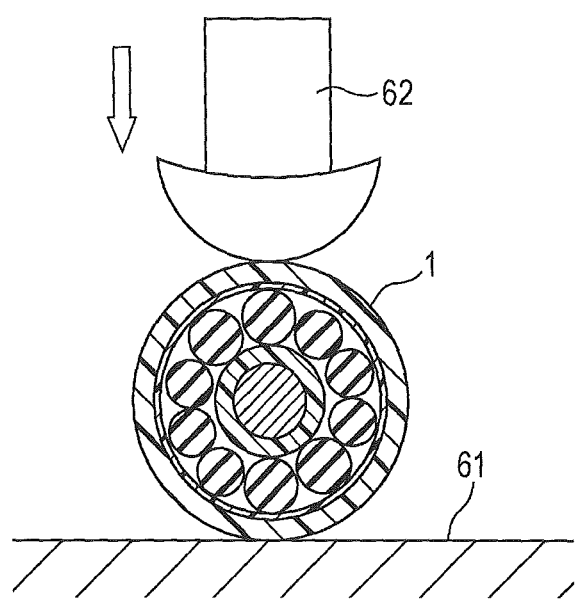
FIG. 6 is a schematic view illustrating cable lateral-pressure testing in the present invention.

As illustrated in FIG. 6, a lateral-pressure testing jig 62 was used to vertically apply a load from top to down to the optoelectrical composite cable 1 placed on a test bench 61, to perform cable lateral-pressure testing to check the difference of the amount of light output from the optical fibers 2 relative to the amount of light input thereto. In the cable lateral-pressure testing, the contact area of the lateral-pressure testing jig 62 and the optoelectrical composite cable 1 was set to 100 mm² (50 mm×2 mm), and a load applied by the lateral-pressure testing jig 62 was set to 1000 N (10 N/mm²). This is assumed based on a case in which a person with a body weight of 100 kg steps on the optoelectrical composite cable 1 with a narrowest portion of his or her 26-cm shoe.

The result of the cable lateral-pressure testing confirmed that the difference of the amount of output light relative to the amount of input light is 0.1 dB or less (which is within an error range of a measuring instrument) and there are almost no changes in the amounts of light between the input and the output. That is, it was confirmed that, when a person with a body weight of about 100 kg steps on the optoelectrical composite cable 1, there is almost no optical loss due to microbending of the optical fibers 2.

Advantages of the present embodiment will now be described.

In the optoelectrical composite cable 1 according to the present embodiment, the electrical lines 4 that constitute at least one of the pairs of electrical lines have a larger outer diameter than the other electrical lines 4 and are arranged at opposing positions, with the tube 3, which is an inner cylinder, being interposed therebetween.

Such an arrangement makes it possible to separately arrange the electrical lines 4 having a larger outer diameter, thereby making it possible to suppress imbalance in the cross-sectional shape. As a result, it is possible to suppress a load being applied to the tube 3, to suppress an increase in optical loss due to microbending of the optical fibers 2 during application of an external force such as bending, and to suppress breakage of the optical fibers 2, thus making it possible to enhance the reliability. In addition, the suppression of imbalance in the cross-sectional shape makes it easier to wire the optoelectrical composite cable 1 in a desired layout.

In the optoelectrical composite cable 1, the electrical lines 4 are helically wound around the outer circumferential surface of the tube 3, which is an inner cylinder, and are interposed between the tube 3 and the outer cylinder 5.

Such an arrangement makes it possible to reduce optical loss due to microbending of the optical fibers 2 while suppressing a reduction in flexibility.

The present invention is not limited to the embodiment described above, and it goes without saying that various changes and modifications can be made without departing from the spirit and scope of the present invention.

For example, although a case in which two power feeder lines 9 and two ground lines 10 are arranged so as to oppose each other has been described in the above embodiment, the present invention is not limited thereto. For example, the arrangement may also be such that one power feeder line 9 and one ground line 10 are arranged adjacent to each other and these two power-supply lines 8 are arranged so as to oppose each other.

Although the invention has been described with respect to specific exemplary embodiments for complete and clear disclosure, the appended claims are not to be thus limited but are to be construed as embodying all modifications and alternative constructions that may occur to one skilled in the art which fairly fall within the basic teaching herein set forth.

Further, it is noted that Applicant's intent is to encompass equivalents of all claim elements, even if amended later during prosecution.

What is claimed is:

1. An optoelectrical composite cable comprising:
   an optical fiber;
   a resin inner cylinder that accommodates the optical fiber;
   a plurality of electrical lines arranged outside the inner cylinder so as to cover a surrounding of the inner cylinder; and
   a tubular outer cylinder that collectively covers the plurality of electrical lines, wherein the plurality of electrical lines comprise pairs of electrical lines, and the electrical lines constitute at least one of the pairs of electrical lines have an outer diameter greater than the other electrical lines and are arranged at opposing positions, with the inner cylinder being interposed therebetween, and wherein each of the plurality of electrical lines includes a center conductor which is covered with an insulator.

2. The optoelectrical composite cable, according to claim 1, wherein the plurality of electrical lines comprise signal lines that constitute the pair of electrical lines for signal transmission and power-supply lines that constitute the pair of electrical lines for power supply, and the power-supply lines have an outer diameter greater than the signal lines and are arranged at opposing positions, with the inner cylinder being interposed therebetween.

3. The optoelectrical composite cable according to claim 2, wherein the power-supply lines comprise a power feeder line and a ground line; and the power feeder line and the ground line are arranged at opposing positions, with the inner cylinder being interposed therebetween.

4. The optoelectrical composite cable according to claim 3, wherein the power feeder line comprises a plurality of power feeder lines, and the ground line comprises a plurality of ground lines.

5. The optoelectrical composite cable according to claim 4, wherein the plurality of power-supply lines are arranged adjacent to each other, and the plurality of ground lines are arranged adjacent to each other.

6. The optoelectrical composite cable according to claim 1, wherein the plurality of electrical lines are helically wound around an outer circumferential surface of the inner cylinder and are interposed between the inner cylinder and the outer cylinder, and when the inner cylinder receives a load upon receiving an external force from a circumference side of the outer cylinder, the adjacent electrical lines contact each other and the electrical lines slide relative to the inner cylinder to thereby reduce the load.

7. The optoelectrical composite cable according to claim 1, wherein each of the plurality of electrical lines contacts an adjacent electrical line of the plurality of electrical lines.

8. The optoelectrical composite cable according to claim 1, wherein the plurality of electrical lines comprise signal lines that constitute the pair of electrical lines for signal transmission and power-supply lines that constitute the pair of electrical lines for power supply.

9. The optoelectrical composite cable according to claim 1, wherein the optoelectrical composite cable is symmetrical with respect to a center axis of the resin inner cylinder.

10. The optoelectrical composite cable according to claim 2, wherein the outer diameter of the power supply lines is set according to a number of the power supply lines.

11. The optoelectrical composite cable according to claim 10, wherein the outer diameter of the power supply lines decreases as the number of the power supply lines increases.

12. The optoelectrical composite cable according to claim 2, wherein the outer diameter of the power supply lines and the outer diameter of the signal lines is set so as to satisfy the expression:

$$0.8 \times D_2 \leq D_1 < D_2,$$

where the outer diameter of a widest power supply line of the power supply lines is $D_2$ and the outer diameter of a narrowest signal line of the signal lines is $D_1$.

13. The optoelectrical composite cable according to claim 1, wherein a number of the plurality of electrical lines is in a range between 4 and 20.

14. The optoelectrical composite cable according to claim 1, wherein an outer diameter of the resin inner cylinder is 80% or more of a distance between the outer diameter of the resin inner cylinder and an inner diameter of the outer cylinder.

15. The optoelectrical composite cable according to claim 1, wherein central axes of the plurality of electric lines are inclined relative to a longitudinal direction of the cable.

16. The optoelectrical composite cable according to claim 1, wherein a pitch of a helical winding of the plurality of electric lines is in a range between 5 mm and 150 mm.

17. The optoelectrical composite cable according to claim 1, further comprising a reinforcement member encompassing the optical fiber and disposed inside the resin inner cylinder.

18. The optoelectrical composite cable according to claim 17, wherein a volume of the reinforcement member in a space inside the resin inner cylinder is in a range of 2% to 50%.

19. The optoelectrical composite cable according to claim 17, wherein the reinforcement member comprises at least 35% of an area inside the resin inner cylinder.

20. The optoelectrical composite cable according to claim 1, wherein an elastic modulus of the resin inner cylinder is between 0.3 GPa to 4.0 GPa.

* * * * *